United States Patent [19]

Petershans et al.

[11] Patent Number: 5,406,881
[45] Date of Patent: Apr. 18, 1995

[54] APPARATUS FOR A DEALCOHOLIZING PLANT

[76] Inventors: Horst Petershans, Schillerstr. 166, 7050 Bittenfeld; Rudolf Korner, Lercehnweg 5, 7518 Bretten/Ruit, both of Germany

[21] Appl. No.: 23,908

[22] Filed: Feb. 22, 1993

[30] Foreign Application Priority Data

Feb. 23, 1992 [DE] Germany .................. 42 05 434.6

[51] Int. Cl.6 ........................................... C12C 13/00
[52] U.S. Cl. ................................. 99/276; 99/323.1
[58] Field of Search ............. 99/275, 276, 277, 277.1, 99/277.2, 278, 323.1, 323.2; 426/28, 29, 30

[56] References Cited

U.S. PATENT DOCUMENTS

| | | | |
|---|---|---|---|
| 2,099,864 | 11/1937 | Miller | 99/277 |
| 3,453,114 | 7/1969 | Bayne | 99/278 |
| 3,563,157 | 2/1971 | Lenz | 99/278 |
| 4,494,451 | 1/1985 | Hickey | 99/276 |

*Primary Examiner*—Robert W. Jenkins

[57] ABSTRACT

In known beverage dealcoholizing plants, one disadvantage is that volatile content materials always escape, and the end product consequently lacks aroma materials and/or preserving materials that were previously present. This disadvantage is eliminated in that the volatile content materials, previously lost into the surroundings via the vacuum pump, are fed back again into the beverage. A duct at the exhaust air pipe, connected to the vacuum pump and leading to a gas washer, circulates the volatile content materials back into the beverage.

21 Claims, 4 Drawing Sheets

APPARATUS FOR A DEALCOHOLIZING PLANT

FIELD OF THE INVENTION

This invention relates to an apparatus for a plant for reducing the alcohol content of beverages that operates with a vacuum.

BACKGROUND OF THE INVENTION

German Offenlegungsschrift (Laid-Open Patent) 3,843,516 shows such an apparatus. Such plants operate with a vacuum. In this case the vacuum is produced there by a single vacuum pump 43 (bottom right in FIG. 1) of the German Laid-Open Patent. The vacuum is maintained through duct 42. The vacuum does not remain constantly in existence. This is less because of air leaks but because a beverage, e.g. in the form of wine or beer, is in fact supplied through the duct 11. At least to this extent, in that a supply of liquid takes place here, but also because of thermal expansion and for other reasons, it is not sufficient to produce a vacuum once only. Rather, the vacuum must be continuously maintained. The word "vacuum" is not to be taken literally here, since an absolute vacuum cannot be produced economically. One or more vacuum pumps can be made use of for the production of this vacuum. Water ring vacuum pumps are usually used. However, rotary vane vacuum pumps can be used, or even venturi nozzles, with which a lower degree of pressure reduction can be attained in a cheaper manner than with water ring vacuum pumps.

Wine, cider, home-made wine, perry, etc., have 400 volatile aroma materials. The majority of these wines have $H_2SO_3$ (sulfurous acid), which is also necessary and permissible, so that oxidation is prevented.

The vacuum pumps now have the property of drawing off volatile constituents, e.g. via the duct 42 of the state of the art, and to discharge them through their exhaust air pipes or the like into the surroundings. On smelling these exhaust air pipes, they are found to smell of sulfur and/or aroma materials. The loading of the environment is very small. However, the final product lacks these materials. Indeed, during the reduction of the alcohol content, in the ideal case it would be preferred to remove solely the ethyl alcohol and not the aroma materials. A filter would be desired with an infinite edge steepness for very selective filtration. Moreover, the liquid of reduced alcohol content is also to be stable, so that it has a sufficiently long life.

SUMMARY OF THE INVENTION

The object of the invention is to again increase the edge steepness of such a plant, considered overall as a filter.

According to the invention, this is solved by a vacuum pump for maintaining a reduced pressure in at least one portion of the plant, a reduced pressure duct leading to the plant and containing volatile content materials when in operation, an exhaust pipe connected to the vacuum pump, a second duct at the exhaust air pipe leading at least indirectly, to a beverage of reduced alcohol content, and operating liquid for the vacuum pump comprising at least a partial stream of the beverage.

Even the last residue of aroma materials is thereby fed back again. The better the sensory faculties of the consumers, the more sensitively they react to a lack of volatile aroma materials. Many easily volatile aroma materials are already volatilized at 10°–15° C. For example, they include all of the amyl alcohol and all amyl acetate; and furthermore, many ester components and easily volatile alcohols.

Moreover, the $H_2SO_3$ splits under the action of heat into $H_2O$ and $SO_2$. If sulfur dioxide $SO_2$ is now added to the water again, it dissolves again to form sulfurous acid.

Advantageously, the apparatus according to the invention includes one or more of the following features:

The vacuum pump comprises a water ring, or a rotary disk, or a venturi nozzle.

The volatile content materials include aroma materials and $SO_2$.

A device leading from the second duct is provided for adding volatile content materials to the beverage. This device includes a gas washer. The gas washer can be counterflow gas washer, or the gas washer can operate according to the condensation principle, or the absorption principle.

The gas washer has an upper supply device for supplying the beverage and a bottom portion, at which the second duct enters the gas washer. The supply device is a fine spray nozzle.

Packed materials are provided in the gas washer for impingement by the beverage during operation of the gas washer.

The device for adding volatile content materials to the beverage is a cold air dryer.

The beverage supplied to the device passes through a cooler.

The operating liquid for the vacuum pump is water suitable for beverages. The water comprises water for brewing and/or the water is demineralized water, or the water is drinking water of permissible quality in connection with the beverage.

DESCRIPTION OF THE DRAWINGS

The invention will now be described with reference to a preferred embodiment example. In the drawings.

DETAILED DESCRIPTION

Figure 1:
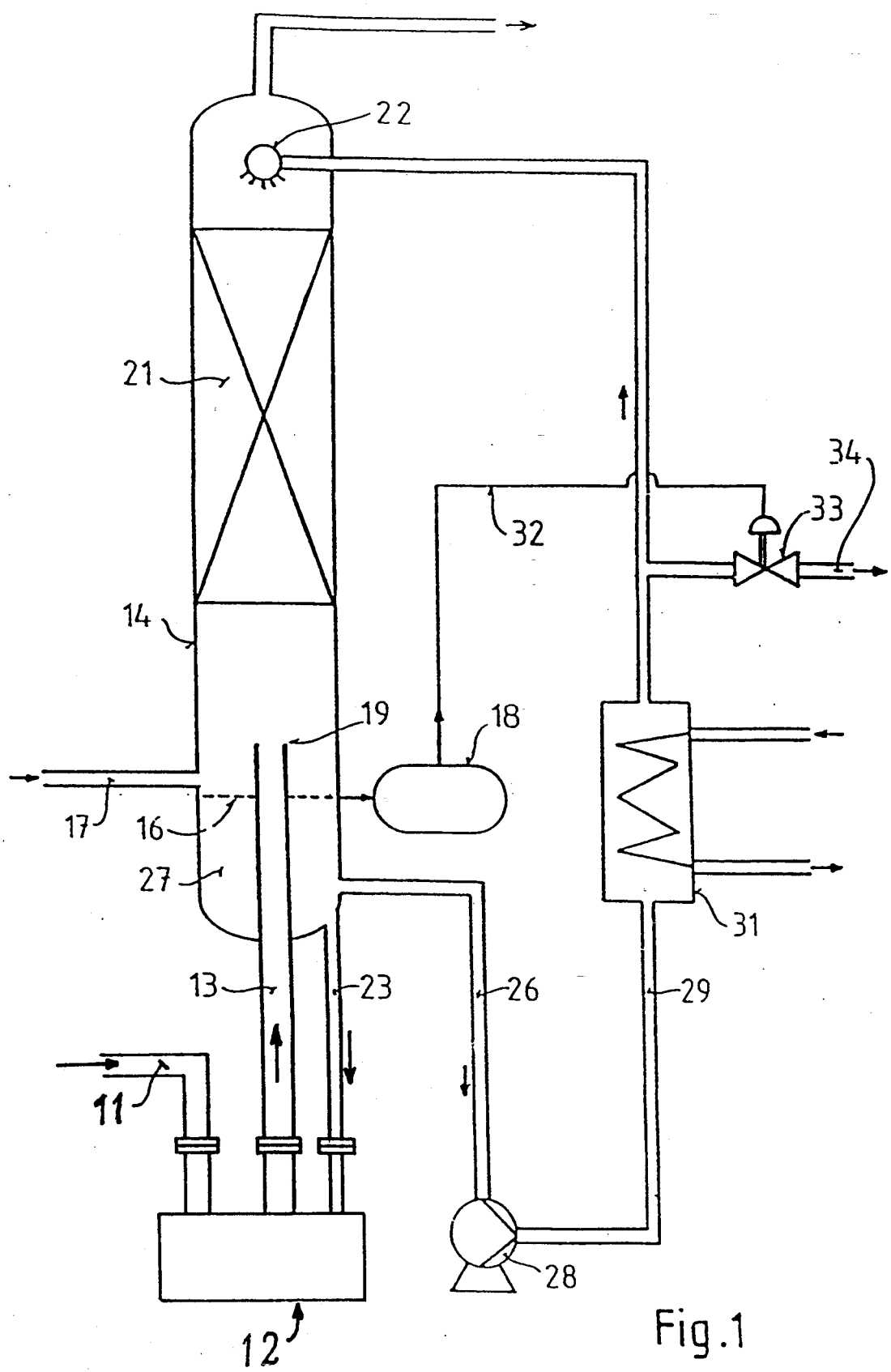
FIG. 1 shows a layout diagram.

Starting from German Offenlegungsschrift 3,843,516 as the state of art, the duct 11 shown in FIG. 1 corresponds to the duct 42 in the German document, and a vacuum pump 12 corresponds to the vacuum pump 43 in the German document. The invention can however also be connected to follow an apparatus according to the Ventriterm process and the evaporation process, both of which operate with reduced pressure. The apparatus according to the invention can also be connected to follow an osmosis apparatus or a dialysis apparatus, although these apparatuses primarily do not operate with reduced pressure. Since however large quantities of residual liquid arise, the residual quantities are further thermally reduced in alcohol content in these processes or apparatuses also. The reduction can amount to a few percent. A beverage is classed as dealcoholized in which the alcohol content has been reduced to 0.5 volume %.

The apparatus according to the present invention permits a reduction of 0.06 volume %.

According to the embodiment example, an exhaust air duct 13 leads from the vacuum pump 12 and ends, in fact above a level 16, within an elongate housing 14 which stands perpendicularly. A duct 17 for the dealcoholized product ends above this level 16. According to the quantity for which the plant is designed, the whole volume of the dealcoholized product, or else only a partial volume of it, can flow through the duct 17. The height of the level 16 is sensed by a level sensor 18. The upper end 19 of the exhaust air duct 13 must always lie above the level 16. A packed column 21, which has a very large surface, is provided in the middle to upper region of the housing 14. A spray device 22 is provided above the packed column 21. The dealcoholized liquid is sprayed by means of this device 22, so that it trickles down over the large surface of the packed column 21. The volatile content materials coming from the end 19 below rise upwards and are united with the dealcoholized liquid coming from above.

A duct 23 leaves considerably below the level 16 and pumps dealcoholized liquid to the "water ring" 24 of the vacuum pump 12. The volatile content materials already unite there, at least in part, with the dealcoholized liquid, which in fact is situated above the vacuum pump 12 up to the level 16, so that it has a certain hydrostatic pressure. The hydrostatic pressure of this liquid volume 27 up to the level 16 drives the vacuum pump 12. The operating liquid is the dealcoholized liquid. In the present invention we replace water that is normally used to drive the vacuum pump with the dealcoholized liquid.

A further duct 26 removes, as does the duct 23, dealcoholized liquid from this liquid volume 27. The liquid is pumped via a pump 28 with a duct 29 to the spray device 22. The liquid at this time passes through a cooler (cold air drier) 31, since the absorption ability is greater when the liquid sprayed by the spray device 22 is cool. The level switch 18 is connected via an electrical lead 32 to a magnetic valve 33. If the level 16 rises too much, the magnetic valve is opened and a portion of the dealcoholized liquid flows out of the duct 29 via the duct 34. If the vacuum pump consumes for its water ring 24 as much dealcoholized liquid as is produced, then the whole volume of the dealcoholized product comes out of the duct 34. Otherwise, the duct 34 leads to where the dealcoholized product is collected: in the state of the art, lastly in the supply container 21 in the German document. Thus, the dealcoholized product or liquid (i.e., the beverage of reduced alcohol content) is used as the operating liquid for the vacuum pump. As shown, this dealcoholized liquid pumps the vacuum pump 12. Also, moving through the duct 26, the dealcoholized liquid passes to the pump 28, rises via the duct 29 and is sprayed by the spray device 22. This liquid also operates the vacuum pump 12, via the duct 23.

Figure 2:
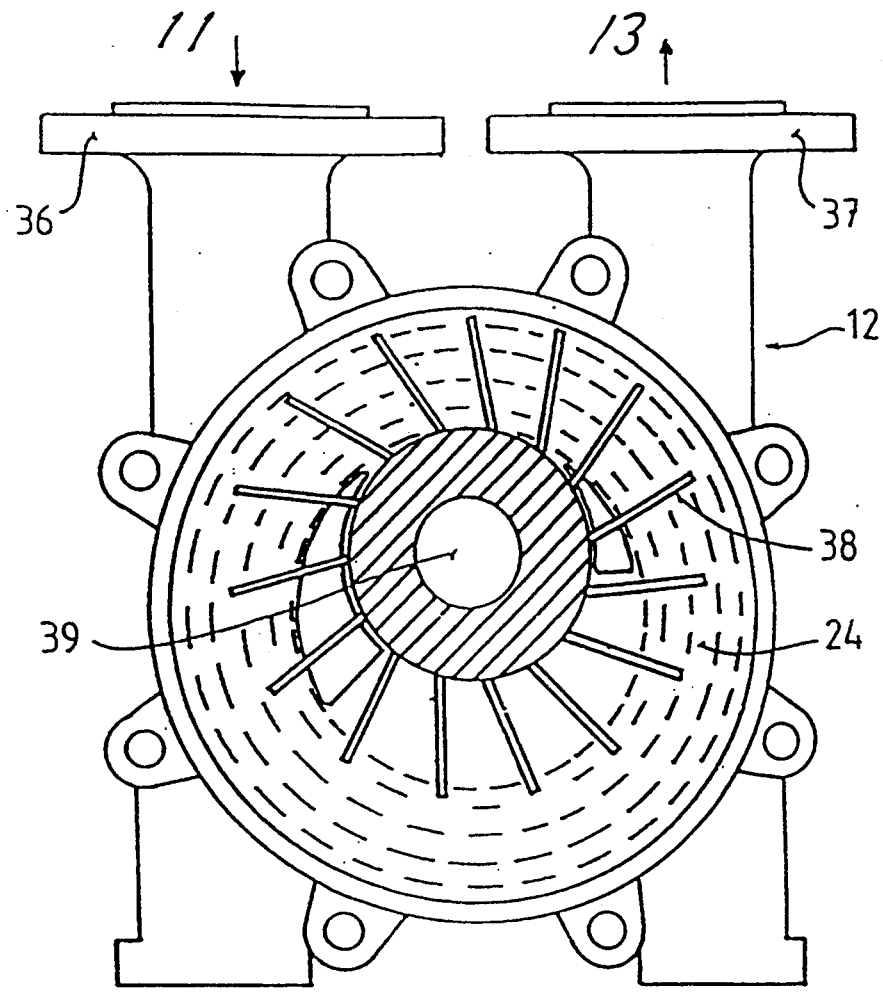
FIG. 2 shows a cross-section through a water ring vacuum pump.

The vacuum pump 12 is known per se, e.g. from an article by Dipl.-Ing. E. Mohrdieck, or others. The intake pipe 36, at which the duct 11 ends, and the exhaust air pipe 37, from which the duct 13 leaves, are seen in FIG. 2. The duct 23 is connected, in a manner now shown, to the volume of the water ring 24 which, as described above, does not consist of water here, but of dealcoholized liquid. Furthermore the vanes 38 are recognized, and also the rotary shaft 39 driven by a motor.

With foaming beverages such as, e.g., beer, the beverage of reduced alcohol content is not used as the operating liquid for the vacuum pump. Instead, water flows in through the duct 17. In the case of beer, this can be water for brewing. In the case of wine, it can be demineralized water. If mains water is available which corresponds to the pertinent standards for additions to beverages, the mains water can also be used.

This water flows in through the duct 17, passes via the duct 26 to the pump 28, rises via the duct 29 and is sprayed by the spray device 22 into the housing 14 at the top. The vacuum pump 12 is also operated with this "water," to which the gaseous, easily volatile aroma materials are supplied, as usual, via the duct 11. In the case of beer, the sulfur dioxide is omitted. Thus the apparatus remains as in the arrangement of FIG. 1. Only the operation is different. This water of the vacuum pump 12 is exchanged in continuous flow, so that, as described in the first embodiment example, it flows through the plant according to FIG. 1. The quantity of the added "water" here corresponds at least substantially, but preferably exactly, to that quantity in which an alcohol concentrate was removed from the liquid of reduced alcohol content. According to legal requirements, the quantity can however be greater or lesser.

The water ring pump 12 (FIG. 2) and rotary disk pump 12' (FIG. 3) merely are different in the known way of sealing the rotor vanes with respect to the pump chamber. Both known pumps have a rotor with radially protruding vanes.

According to FIG. 2 the vanes 38 are fixedly mounted on the rotary shaft 39. Their radially outward ends dive more or less into a fluid ring of substantial radial thickness, which provides a gas tight sealing.

Figure 3:
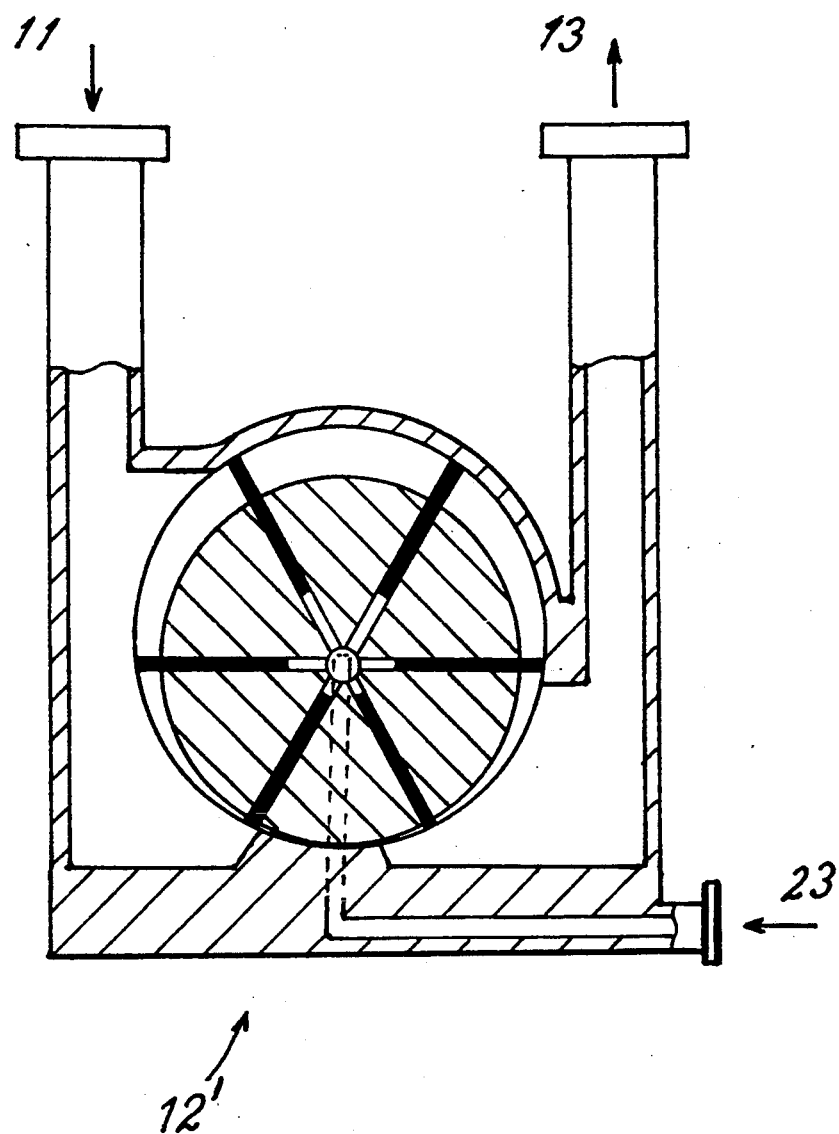
FIG. 3 shows a cross section through a rotary disk pump.

According to FIG. 3 the vanes 40 are slidably mounted on the rotor 41, so that their outward ends can follow the contour of the chamber in a sealingly manner.

Figure 4:
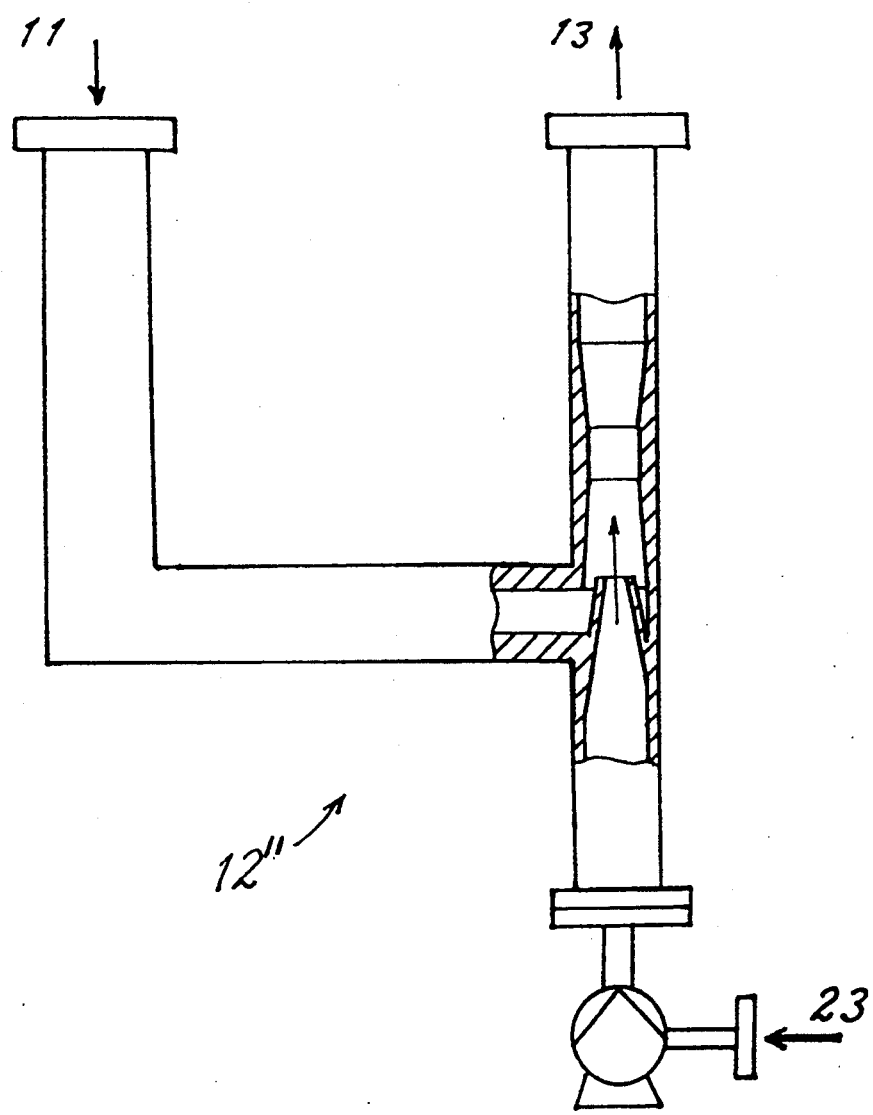
FIG. 4 shows a layout diagram including a venturi nozzle.

The known "ventury pump" 12'' of FIG. 4 needs an auxiliary pump 43 in order to force the "wine" into the venturi nozzle 42. The auxiliary pump 43 is of the same well known type as pump 28 in FIG. 1.

We claim:

1. Apparatus for a plant for reducing the alcohol content of beverages that operates with a vacuum, comprising:
   vacuum pump means for maintaining a reduced pressure in at least one portion of said plant,
   reduced pressure duct means leading to said plant and containing volatile content materials when in operation,
   exhaust air pipe means connected to said vacuum pump means,
   second duct means at said exhaust air pipe means leading at least indirectly, to a beverage of reduced alcohol content, and
   operating liquid for said vacuum pump means comprising at least a partial stream of said beverage.

2. Apparatus according to claim 1, wherein said vacuum pump means comprises water ring vacuum pump means.

3. Apparatus according to claim 1, wherein said vacuum pump means comprises rotary disk vacuum pump means.

4. Apparatus according to claim 1, wherein said vacuum pump means comprises venturi nozzle means.

5. Apparatus according to claim 1, wherein said volatile content materials include aroma materials.

6. Apparatus according to claim 1, wherein said volatile content materials include $SO_2$.

7. Apparatus according to claim 1, further comprising device means leading from said second duct means for adding said volatile content materials to said beverage.

8. Apparatus according to claim 7, wherein said device means includes gas washer means.

9. Apparatus according to claim 8, wherein said gas washer means operates according to the absorption principle.

10. Apparatus according to claim 8, wherein said gas washer means operates according to the condensation principle.

11. Apparatus according to claim 8, wherein said gas washer means comprises a counterflow gas washer.

12. Apparatus according to claim 11, wherein said gas washer means has an upper supply device for supplying said beverage and a bottom portion at which said second duct means enters said gas washer means.

13. Apparatus according to claim 12, wherein said supply device comprises a fine spray nozzle.

14. Apparatus according to claim 8, further comprising packed material means in said gas washer means for impingement by said beverage during operation of said gas washer.

15. Apparatus according to claim 7, wherein said device means comprises air drier means.

16. Apparatus according to claim 15, wherein said device means comprises cold drier means.

17. Apparatus according to claim 7, wherein said beverage supplied to said device means passes through cooler means.

18. Apparatus especially according to claim 1, wherein said operating liquid for said vacuum pump means comprises water suitable for beverages.

19. Apparatus according to claim 18, wherein said water comprises water for brewing.

20. Apparatus according to claim 18, wherein said water comprises demineralized water.

21. Apparatus according to claim 18, wherein said water is drinking water of permissible quality in connection with said beverage.

* * * * *